(12) United States Patent
Bennett et al.

(10) Patent No.: US 9,092,861 B2
(45) Date of Patent: Jul. 28, 2015

(54) USING MOTION INFORMATION TO ASSIST IN IMAGE PROCESSING

(75) Inventors: James Bennett, Hroznetin (CZ); Gordon (Chong Ming Gordon) Lee, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 35 days.

(21) Appl. No.: 13/313,352

(22) Filed: Dec. 7, 2011

(65) Prior Publication Data

US 2013/0021483 A1 Jan. 24, 2013

Related U.S. Application Data

(60) Provisional application No. 61/509,747, filed on Jul. 20, 2011.

(51) Int. Cl.
| | |
|---|---|
| H04N 5/228 | (2006.01) |
| G06K 9/36 | (2006.01) |
| G06T 5/00 | (2006.01) |
| H04N 5/232 | (2006.01) |
| G06T 5/50 | (2006.01) |
| H04N 19/56 | (2014.01) |
| H04N 19/139 | (2014.01) |
| H04N 19/192 | (2014.01) |
| H04N 19/436 | (2014.01) |
| H04N 19/54 | (2014.01) |

(52) U.S. Cl.
CPC . *G06T 5/003* (2013.01); *G06T 5/50* (2013.01); *H04N 5/23254* (2013.01); *H04N 5/23267* (2013.01); *H04N 19/139* (2014.11); *H04N 19/192* (2014.11); *H04N 19/436* (2014.11); *H04N 19/54* (2014.11); *H04N 19/56* (2014.11); *G06T 2207/10016* (2013.01); *G06T 2207/20201* (2013.01)

(58) Field of Classification Search
USPC ......... 348/699; 375/240.16, 240.17; 382/107, 382/236
See application file for complete search history.

(56) References Cited

U.S. PATENT DOCUMENTS

| | | | |
|---|---|---|---|
| 6,380,986 B1 * | 4/2002 | Minami et al. ................. | 348/699 |
| 2001/0017887 A1 * | 8/2001 | Furukawa et al. ....... | 375/240.03 |
| 2003/0053543 A1 * | 3/2003 | Bhaumik et al. ......... | 375/240.16 |
| 2005/0063462 A1 * | 3/2005 | Lee ........................... | 375/240.03 |
| 2006/0110147 A1 * | 5/2006 | Tomita et al. ................... | 396/55 |
| 2006/0210184 A1 * | 9/2006 | Song et al. .................... | 382/239 |
| 2007/0091997 A1 * | 4/2007 | Fogg et al. ................. | 375/240.1 |
| 2007/0180910 A1 * | 8/2007 | Inaguma et al. ............ | 73/504.15 |
| 2009/0060039 A1 * | 3/2009 | Tanaka et al. ............ | 375/240.13 |
| 2009/0102935 A1 * | 4/2009 | Hung et al. ................. | 348/222.1 |
| 2009/0153677 A1 * | 6/2009 | Taoka ......................... | 348/208.1 |
| 2009/0160958 A1 * | 6/2009 | Yamada et al. .......... | 348/208.99 |
| 2009/0169120 A1 * | 7/2009 | Otani ............................ | 382/232 |
| 2009/0323810 A1 * | 12/2009 | Liu et al. .................. | 375/240.16 |
| 2010/0189179 A1 * | 7/2010 | Gu et al. .................. | 375/240.16 |
| 2012/0306999 A1 * | 12/2012 | Zhou ............................... | 348/36 |

* cited by examiner

*Primary Examiner* — Roberto Velez
*Assistant Examiner* — Stephen Coleman
(74) *Attorney, Agent, or Firm* — McDermott Will & Emery LLP

(57) ABSTRACT

Embodiments of the present application use motion information of an imaging device in encoding video or image frames captured by the imaging device. In one embodiment, a video encoding system that processes image data captured by an image sensor comprises at least one encoder that receives motion information describing motion of the imaging sensor during capturing of the image data and that encodes the image data with assistance of the motion information.

20 Claims, 15 Drawing Sheets

USING MOTION INFORMATION TO ASSIST IN IMAGE PROCESSING

CROSS-REFERENCE TO RELATED APPLICATION

This application claims priority to copending U.S. provisional application entitled, "Image Capture Device Systems and Methods," having Ser. No. 61/509,747, filed Jul. 20, 2011, which is entirely incorporated herein by reference.

BACKGROUND

Real time video encoding involves inter-frame correlation for compression. That is, on a block by block basis in a current video frame, a search process is performed which involves comparing a current frame block with neighboring frame blocks in and around the same vicinity of the frame. When a closely matching neighboring block is found, a location offset from the current frame block is generated (e.g., motion vector) as well as difference signals between the two. This searching process is very time/resource consuming as there is no knowledge as to how far and in what direction such block counterpart will be found.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

This disclosure pertains to a device, method, computer useable medium, and processor programmed to using motion information of an imaging device in encoding video or image frames captured by the imaging device. As one possible example, the motion information may be used to reduce or correct motion blur as part of an image processing pipeline in a digital camera, digital video camera, or other imaging device. One of ordinary skill in the art would recognize that the techniques disclosed may also be applied to other contexts and applications as well.

For cameras in embedded devices, e.g., digital cameras, digital video cameras, mobile phones, personal data assistants (PDAs), tablets, portable music players, and desktop or laptop computers, techniques such as those disclosed herein can improve image quality without incurring significant computational overhead or power costs. Further, power-savings may be realized.

To acquire image data, a digital imaging device may include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline circuitry, which may apply a number of various image processing operations to the image data to generate a full color image or sequence of video frames that may be displayed for viewing on a display device or screen.

Figure 1:
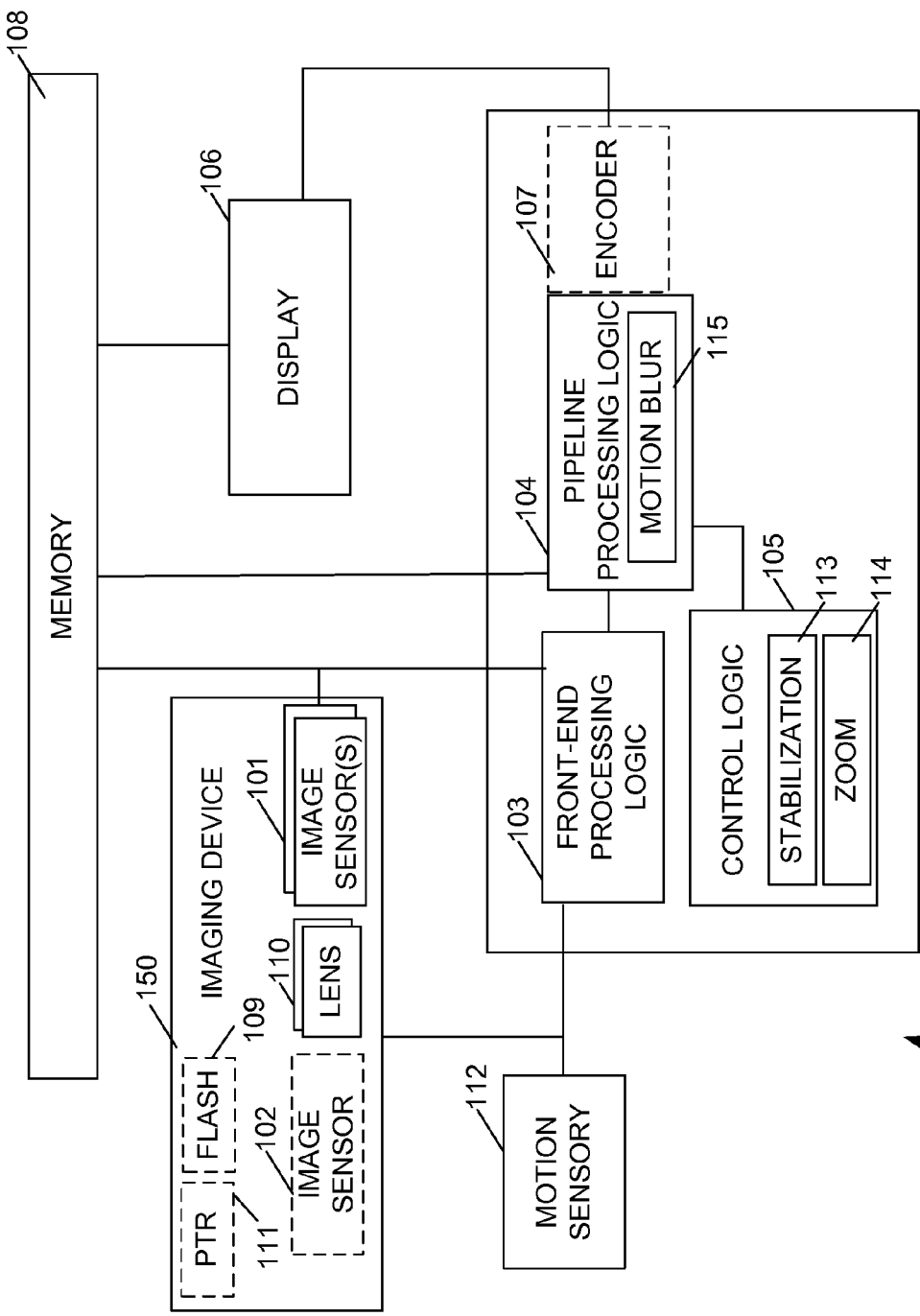
FIG. 1 is a block diagram of one embodiment of an image processing circuitry according to the present disclosure.

Referring to FIG. 1, a block diagram of one embodiment of an image processing circuitry 100 is shown for an image capture or imaging device 150. The illustrated imaging device 150 may be equipped with a digital camera configured to acquire both still images and moving images (e.g., video). The device 150 may include lens(es) 110 and one or more image sensors 101 configured to capture and convert light into electrical signals. By way of example only, the image sensor may include a CMOS (complementary metal-oxide-semiconductor) image sensor (e.g., a CMOS active-pixel sensor (APS)) or a CCD (charge-coupled device) sensor. In some embodiments, a supplemental image sensor 102 is also integrated, where the supplemental image sensor 102 captures an image of a laser pointer dot or multiple laser pointer dots, as discussed below. The supplemental image sensor 102 may employ a wavelength filter for the laser pointer dot(s). Alternatively, in some embodiments, a main image sensor 101 may employ a wavelength filter to capture a trace of a laser pointer dot to derive an estimate of "camera motion" or imaging device 150 motion that may be used in subsequent image processing.

A flash light source (e.g., a light emitting diode) 109 may also be provided near the lens 110 to aid in providing light in a dark environment, in some embodiments. If the imaging device 150 detects that ambient light is insufficiently bright to properly expose a picture, the imaging device 150 enables the flash 109 and the picture is taken. Additionally, a laser pointer device 111 is also provided in some embodiments. In certain modes of operation, the laser pointer device 111 projects a laser point/dot or laser points onto a scene being photographed allowing the laser pointer device 111 to be captured which may characterize the motion of the imaging device 150 during photographing of the image. In some embodiments, the laser pointer device 111 is equipped with a lens that projects multiple laser dots or a particular pattern of laser dots (e.g., a rectangular grid) as opposed to a single laser dot.

One or more motion sensory components 112 are also integrated in the imaging device 150, in some embodiments. In one embodiment, the motion sensory component 112 is a plurality of accelerometers that comprises an x-axis accelerometer that detects movement of the device 150 along an x-axis, a y-axis accelerometer that detects movement of the device along a y-axis and a z-axis accelerometer that detects movement of the device along a z-axis. In combination, the accelerometers are able to detect rotation and translation of the imaging device 150. Alternatively, or in conjunction, the motion sensory component 112 may also feature a gyroscope that measures rotational motion of the imaging device 150. Accordingly, one or more motion sensory components 112 may detect "camera motions," such as those caused from or by vibrations, panning, zooming, etc. Further, information obtained by the motion sensory component(s) 112 may be used to enhance encoding of captured images or video.

Motion sensory component(s) 112, such as accelerometers and gyroscopes, may be employed for a variety of uses.

Electronic devices, such as smartphones, digital audio players, personal digital assistants, tablets, etc., use motion sensory component(s) 112 for user interface control, such as presenting landscape or portrait views of the device's screen, based on the way the device is being held, or as motion input, such as for indicating steering during a car racing game.

In some embodiments, the image processing circuitry 100 may include various subcomponents and/or discrete units of logic that collectively form an image processing "pipeline" for performing each of the various image processing steps. These subcomponents may be implemented using hardware (e.g., digital signal processors or ASICs (application-specific integrated circuits)) or software, or via a combination of hardware and software components. The various image processing operations may be provided by the image processing circuitry 100.

The image processing circuitry 100 may include front-end processing logic 103, pipeline processing logic 104, and control logic 105, among others. The image sensor(s) 101 may include a color filter array (e.g., a Bayer filter) and may thus provide both light intensity and wavelength information captured by each imaging pixel of the image sensors 101 to provide for a set of raw image data that may be processed by the front-end processing logic 103.

In some embodiments, a single lens 110 and a single image sensor 101 may be employed in the image processing circuitry. While in other embodiments, multiple lens 110 and multiple image sensors 101 may be employed, such as for a stereoscopy uses, among others.

The front-end processing logic 103 may also receive pixel data from memory 108. For instance, the raw pixel data may be sent to memory 108 from the image sensor 101. The raw pixel data residing in the memory 108 may then be provided to the front-end processing logic 103 for processing.

Upon receiving the raw image data (from image sensor 101 or from memory 108), the front-end processing logic 103 may perform one or more image processing operations. The processed image data may then be provided to the pipeline processing logic 104 for additional processing prior to being displayed (e.g., on display device 106), or may be sent to the memory 108. The pipeline processing logic 104 receives the "front-end" processed data, either directly from the front-end processing logic 103 or from memory 108, and may provide for additional processing of the image data in the raw domain, as well as in the RGB and YCbCr color spaces, as the case may be. Image data processed by the pipeline processing logic 104 may then be output to the display 106 (or viewfinder) for viewing by a user and/or may be further processed by a graphics engine. Additionally, output from the pipeline processing logic 105 may be sent to memory 108 and the display 106 may read the image data from memory 108. Further, in some implementations, the pipeline processing logic 104 may also include an encoder 107, such as a compression engine, for encoding the image data prior to being read by the display 106.

The encoder 107 may be a JPEG (Joint Photographic Experts Group) compression engine for encoding still images, or an H.264 compression engine for encoding video images, or some combination thereof. Also, it should be noted that the pipeline processing logic 104 may also receive raw image data from the memory 108.

The control logic 105 may include a processor and/or microcontroller configured to execute one or more routines (e.g., firmware) that may be configured to determine control parameters for the imaging device 150, as well as control parameters for the pipeline processing logic 104. By way of example only, the control parameters may include sensor control parameters, camera flash control parameters, lens control parameters (e.g., focal length for focusing or zoom), or a combination of such parameters for the image sensor(s) 101. The control parameters may also include image processing commands, such as auto-white balance, autofocus, autoexposure, and color adjustments, as well as lens shading correction parameters for the pipeline processing logic 104. The control parameters may further comprise multiplexing signals or commands for the pipeline processing logic 104.

Control logic 105 may further include image stabilization logic 113. Embodiments of the image stabilization logic 113 utilize information obtained by the motion sensory component(s) 112 to compensate for image sensor movement. Various techniques may be employed by the image stabilization logic to compensate for detected image sensor movement. One technique involves varying an optical path to the image sensor. For example, the image sensor 101 may be moved in the optical path to stabilize the image projected on the image sensor 101 and counteract "camera shake" or shaking of the imaging device 150. Accordingly, the image stabilization logic can use the motion information to determine signals that correct the detected movement and send the signals to the image sensor 101 (or possibly lens 110). For embodiments where the lens 110 is able to be moved within the optical path, a floating lens element may be used. For embodiments where the image sensor 101 moves, an actuator may be used that receives signals from the image stabilization logic 113 that cause the image sensor 101 to move or shift and counteract motion of the imaging device 150. Another possible technique used by the image stabilization logic is to delay activating a "shutter" of the image sensor 101 when the imaging device 150 is detected to be moving.

Figure 2:
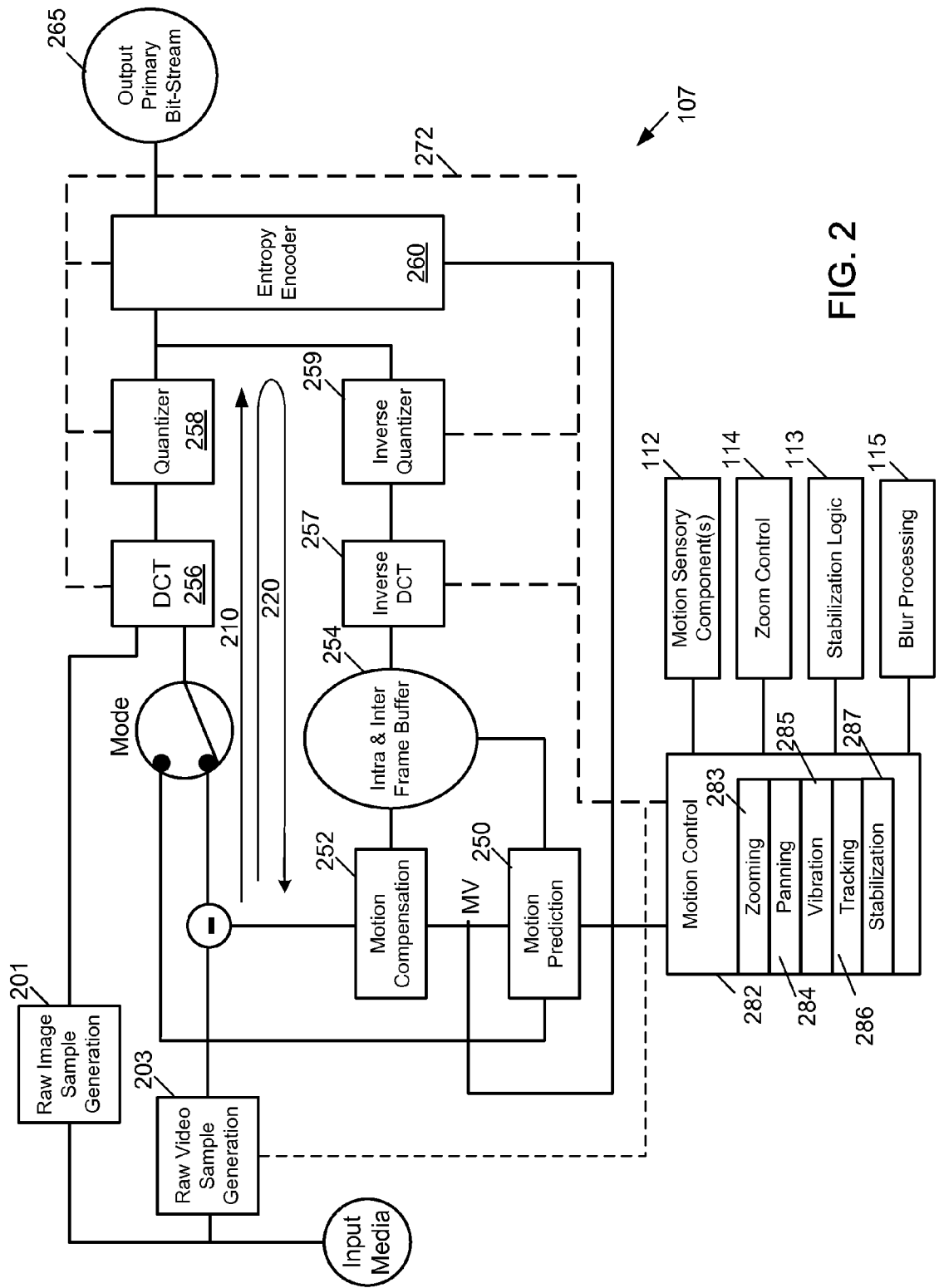
FIG. 2 is a block diagram of an embodiment of an encoder architecture within image processing circuitry of FIG. 1.

Referring now to FIG. 2, one embodiment of encoder architecture 107 is depicted. It is understood that FIG. 2 shows one particular approach from a multitude of encode standards, where additional blocks and steps may be represented.

Captured media, such as video or image data, is partitioned into sample blocks of pixels within respective raw video sample generation 203 and raw image sample generation 201 components. A sample block being processed is compared with sample blocks in neighboring frames or other portions of the same frame. The searches associated with the motion prediction block 250 (as discussed below) are generally intense since many different directions in many different neighboring frames are analyzed. A particular encode standard may define a size of a search area (e.g., how many frames backwards and forwards) to be searched for possible matches with a current block. Other blocks or stages in an encoding process or pipeline may include motion compensation 252, frame buffer 254, etc.

In focusing on operations of the encoder 107, the encoding operation consists of the forward encoding path 210 and an inverse decoding path 220. Following a typical H.264 encoding operation, input media data, such as a video frame, is divided into smaller blocks of pixels or samples. In one embodiment, input media data is processed in units of a macroblock (MB) corresponding to a 16×16 displayed pixels.

In the encoder, the forward encoding path 210 predicts each macroblock using Intra or Inter-prediction. In intra-prediction mode, spatial correlation is used in each macroblock to reduce the amount of transmission data necessary to represent an image. In turn, redundancies in a frame are removed without comparing with other media frames. Diversely, in inter-prediction mode, redundancies are removed by comparing with other media frames.

The encoder 107 then searches pixels from the macroblock for a similar block, known as a reference block. An identification of the reference block is made and subtracted from the current macroblock to form a residual macroblock or prediction error. Identification of the similar block is known as motion estimation. A memory (frame buffer 254) stores the reference block and other reference blocks. The motion prediction block or stage 250 searches the memory for a reference block that is similar to the current macroblock block.

Once a reference block is selected, the reference block is identified by a motion vector MV and the prediction error during motion compensation 252. The residual macroblock and motion vectors are transformed (in DCT stage 256), quantized (in quantizer stage 258), and encoded (in entropy encoder stage 260) before being output.

The transformation is used to compress the image in Interframes or Intra-frames. The quantization stage 258 reduces the amount of information by dividing each coefficient by a particular number to reduce the quantity of possible values that value could have. Because this makes the values fall into a narrower range, this allows entropy coding 260 to express the values more compactly. The entropy encoder 260 removes the redundancies in the final bit-stream 265, such as recurring patterns in the bit-stream.

In parallel, the quantized data are re-scaled (in inverse quantizer stage 259) and inverse transformed (in inverse DCT stage 257) and added to the prediction macroblock to reconstruct a coded version of the media frame which is stored for later predictions in the frame buffer 254.

Motion estimation can potentially use a very large number of memory accesses for determining a reference block. For an input frame, the frame is segmented into multiple macroblocks which are reduced to sets of motion vectors. Accordingly, one whole frame is reduced into many sets of motion vectors.

To illustrate, a high definition television (HDTV) video comprises 1920×1080 pixel pictures per second, for example. A common block size can be, for example, a 16×16 block of pixels. Therefore, an exhaustive search may not be practical, especially for encoding in real time. In one approach, the encoder 107 may limit the search for samples of the current macroblock by reducing a search area with the assistance of motion information 272 independently fed into respective component(s) of the encoding pipeline after being detected and classified by the motion control component 282.

Accordingly, one or more motion sensory components 112 are tapped into the motion control component 282 via interface circuitry. In the example of FIG. 2, an accelerometer 112a is the motion sensory component depicted. Therefore, motion of a camera device such as from unsteady hands, panning, or zooming may be detected by one or more of the motion sensory components 112 and signaled to the motion control component 282. The motion control component 282 will then classify a type of motion being experienced and then use the classification to assist in accelerating the encoding process. Accelerated encoding of media is especially beneficial where real time streaming of the media is involved.

To illustrate, motion information may be used to change encoding resolution, frame rate, DCT sizing, block sizing, etc. For example, motion may be detected and classified or characterized as being a significant amount of blurring. Therefore, a low encoding resolution may be selected, since a high encoding resolution is going to be constrained by the existence of blurring. Accordingly, a low encoding resolution may be sufficient under the circumstances. Similarly, a lower frame rate may be sufficient and selected, since a higher frame rate may be limited due to the presence of motion. Also, in some embodiments, the resolution and/or frame rate may be modified or adjusted to a higher level after the motion is no longer detected.

As an example, after classification of "camera motion," this information can be used to aid a motion prediction element 250 of the encoder 107. That is, such motion prediction may be instructed to seek a motion vector in a particular direction or starting point. Therefore, an output from the motion control component 282 can constrain a search to a particular area that is most likely to yield a positive result.

In some embodiments (as indicated by the dashed line 272), the output from the motion control component 282 constrains or controls other elements within the encoder architecture or pipeline. As an example, overall resolution of captured images could be adjusted to allow for easier processing. Further, the motion control component 282 may determine that the "camera motion" is a panning to cover an area of a scene being photographed. The motion control component 282 may also determine that the motion is fast (e.g., exceeds a defined threshold) and, because the motion is fast, may be expected to suffer a bit of quality reduction. Therefore, the motion control component 282 may give instructions to for the DCT 256 and IDCT 257 apply lesser coefficient output or apply a smaller pattern set. Conversely, where higher quality is desired during such a panning operation, the motion control component 282 may be configured to instruct or signal for more coefficient output or a larger pattern set to be applied. Similar modifications can be made for all other types of motion to any other one or more elements of the encoder 107, including changing the entropy encoder's encoding approach on the fly. As further examples, an overall resolution could be adjusted based on the detected presence of motion. For instance, the resolution may be upconverted or downconverted for a given block.

In addition to motion sensory component(s) 112, the motion control component 282 may also receive inputs from control logic 105, such as a zoom control 114 and image stabilization logic 113. Therefore, in addition to controlling optical or mechanical zoom operation used in previewing and capturing image or video, information from the zoom control 114 can be used to assist part of the encoder 107

The motion control component 282 is equipped with zooming 283, panning 284, vibration 285, tracking 286, stabilization 287, motion blur 288 logics used to receive input from the motion sensory component(s) 112 and/or other components and classify the type of "camera motion" characterized by the input information as indicative of one or more zooming, panning, vibration, tracking, stabilization, and/or motion blur operations. As discussed below, in addition to using the classified motion information to assist in accelerating encoding of captured media, a motion blur processing component 115 is provided to assist in reducing or correcting effects of motion blur in the media based on motion information obtained from motion sensory component(s) 112. Results of the motion blur processing component 115 may then be provided as a feed to the motion control component 282 to assist in encoding of image data.

Regarding the zooming logic 283, if the zoom control 114 provides information that a zoom operation was performed from frame-1 to frame-2, where the image was zoomed in at the magnification power 2×, then a search for a matching block in frame-2 may be better attempted with frame-2 by upconverting the pixels of frame-1 by a factor of 2. Conversely, another approach may be to downconvert the pixels of frame-2 by a factor of 2 before searching for a matching block with neighboring frames. Also, in a scenario where zoom control information indicates that a zoom operation was performed where the image was zoomed out from frame-1 to frame-2, then a search for a matching block in frame-2 may be better attempted with frame-2 by downconverting the pixels of frame-1 by the applicable zoom factor or conversely upconverting the pixels of frame-2 by the applicable zoom factor.

Further, if motion information is available to indicate that the imaging device 150 was moved to in a top-right direction after frame-1 was captured, then the area corresponding to the top-right of frame-1 may be the subject of frame-2. The motion control component 282 may then use the information provided by the zoom control 114 and the motion sensory component(s) 112 to instruct the encoder 107 to consider to being looking for a counterpart match of a block in frame-2 with the top-right portion of frame-1 after frame-1 has been upconverted. Therefore, after classifying "camera motion" as zoom motion, the information may be used to constrain a search for a motion vector to a particular area indicated by the zoom motion information and/or additional motion sensory information.

Accordingly, zooming logic 283 of motion control component 282 can receive zoom control information and/or motion sensory information and use this information to predict a suitable position within neighboring frames to search for matching blocks. Also, vibration logic 285 can receive motion sensory information indicative of "camera shakes" or vibrations and use this information to predict video frames that should be exempted or skipped in searching for motion vectors in motion prediction block 250. In one embodiment, a vibration threshold value may be defined and motion sensory information indicating a vibration frequency level above the threshold value (e.g., 1/4s) may be used to avoid searching for matching blocks in frames captured during the period of vibration. However, consider if frame-3 was captured and corresponded to a vibration frequency that is below the vibration threshold value, then frame-3 may be instructed to be included as part of a motion vector search by the vibration logic 285.

Correspondingly, stabilization logic 287 may be provided signals from the image stabilization logic 113 which indicate when image motion has been compensated. Corresponding frames that are the result of image stabilization may be exempted from a search of matching blocks by the stabilization logic 287, as instructed to the encoder 107. Further, based on a level of stabilization controls 113 used to compensate for motion of the imaging device 150, a threshold value may be used, where frames that are captured under the presence of stabilization controls 113 that exceed the threshold value are exempted.

In addition, panning logic 284 of motion control component 282 may receive motion sensory information and may identify motion characterized as panning and may make logical decisions on how to adjust subsequent encoding. In this scenario, the imaging device 150 and an element or object in a target scene being photographed are in relative motion. For example, panning logic 284 of the motion control component 282 may determine that the "camera motion" is a panning to cover an area of the target scene being photographed and adjust the coefficient output of the DCT 256 and IDCT 257 to apply lesser coefficient output or apply a smaller pattern set, when a lower quality is desired. Conversely, where higher quality is desired during such a panning operation, the motion control component 282 may be configured to apply more coefficient output or apply a larger pattern set. Similar modifications can be made for all other types of motion to any other one or more elements of the encoder 107, including changing the entropy encoder's encoding approach on the fly.

Using such supplemental motion information (e.g., motion related information), the encoding process can be enhanced by limiting search areas and providing a more realistic starting point for such restricted searching. For example, by identifying that the imaging device 150 captured a first frame and then panned to the right before capturing the second frame, it may be advantageous to begin comparing a current frame block at a center of the first frame with blocks on the left side of the second frame, since an item being captured at the center of the first frame is shifting to the left in subsequent frames as the imaging device 150 pans to the right. Therefore, in this example, supplemental motion information may be used to identify a starting point in which to search for the block counterpart in frame by frame image processing. This is but one possible example, and other uses for the motion information to optimize image processing are also contemplated.

Related to panning logic 284 is tracking logic 286, where motion sensory information may be used to identify that an object is being tracked during panning movement. For example, the tracking logic 286, responsive to detecting panning motion, may further perform image analysis to determine whether an object in a sequence of video frames is maintaining a frame position (e.g., center of the frame) as the imaging device 150 moves or pans. A positive determination that an object is being tracked as the imaging device pans may prompt the tracking logic 286 to instruct the encoder 107 to focus on processing pixels in the area of a frame in which the object is positioned. In one embodiment, the quality of the background area of frame may then be decreased or blurred during encoding and the quality of the foreground may be maintained at a high level. This may be significantly advantageous during real-time encoding of a video stream.

In addition to accelerating the encoding of captured images, power-savings by an electronic device 105 implementing the foregoing disclosed processes can be realized. Also, processes and associated hardware used to accelerate encoding with motion sensory information may be activated or deactivated upon user command. Therefore, a user may turn off or turn on the motion control component 282 and related components as desired. Therefore, if a user desires to employ high-powered non-realtime streaming encoding, the processes and associated hardware used to accelerate encoding with motion sensory information may be deactivated, in one embodiment.

Also, embodiments of the motion control component 282 may take advantage of information provided by motion blur processing component 115. As discussed below, image analysis may be performed to identify motion blur or a blurred characteristic within captured images. Accordingly, identification of motion blur in image frames by the pipeline processing logic 104 may be used by the motion control component 282 (e.g., vibration logic 285) to identify individual image frames that were subject to shaking or other "camera motion" that caused the detected motion blur. Therefore, the motion blur logic can limit a search area in the motion prediction block 250 to exclude frames experiencing significant vibration levels.

Figure 3:
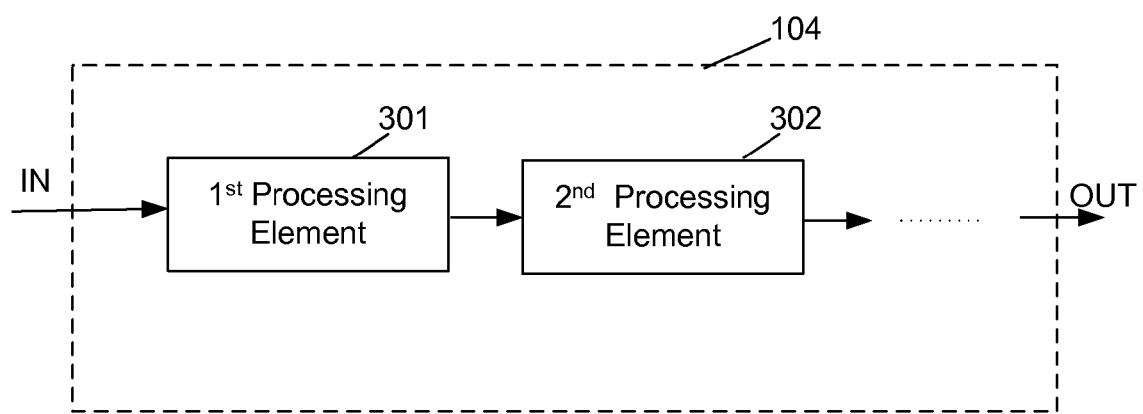
FIG. 3 is a block diagram of an embodiment of an image signal processing pipeline implemented by the pipeline processing logic from the image processing circuitry of FIG. 1.

Referring now to FIG. 3, one embodiment of the pipeline processing logic 104 may perform processes of an image signal processing pipeline by first sending image information to a first process element 301 which may take the raw data produced by the image sensor 101 (FIG. 1) and generate a digital image that will be viewed by a user or undergo further processing by a downstream process element. Accordingly, the processing pipeline may be considered as a series of specialized algorithms that adjusts image data in real-time and is often implemented as an integrated component of a system-on-chip (SoC) image processor. With an image signal processing pipeline implemented in hardware, front-end image processing can be completed without placing any processing burden on the main application processor.

In one embodiment, the first process element 301 of an image signal processing pipeline could perform a particular image process such as noise reduction, defective pixel detection/correction, lens shading correction, lens distortion correction, demosaicing, image sharpening, color uniformity, RGB (red, green, blue) contrast, saturation boost process, etc. As discussed above, the pipeline may include a second process element 302. In one embodiment, the second process element 302 could perform a particular and different image process such as noise reduction, defective pixel detection/correction, lens shading correction, demosaicing, image sharpening, color uniformity, RGB contrast, saturation boost process, video compression, encoding, etc. The image data may then be sent to additional element(s) of the pipeline as the case may be, saved to memory, and/or input for display.

Accordingly, in one embodiment, a process element, such as the first process element 301, may perform a routine of correcting or reducing motion blur in a captured image data. In this particular embodiment, the captured image data is analyzed for bright points that are visible or detectable in the image that have created a trace or streak of highlights within the image data created by motion of the imaging sensor 101 or possibly an element in the photographed scene during exposure of the image data. The highlights may be created on a shiny surface being photographed. If there are several of these highlights, they will trace similar images caused by movement of the imaging device 150. Accordingly, searching of and detection of such a trace can help derive the motion that caused blurring in the image data. In one embodiment, highlights are searched for common patterns to derive the point spread function (PSF), which gives an idea of the motion of the camera e.g. to deconvolve the PSF with the image to approximate the original image. To make the highlights easier to detect and possibly stand out, the image data may be processed, such as by increasing the contrast for the image, before detection of highlights is commenced.

Therefore, once a path of the motion is determined, a point spread function for the motion can be estimated and used to correct the image data undergoing processing. In particular, with the point spread function for the motion found, deconvolution of the image data may be employed to sharpen the image.

It is noted that once the point spread function for the motion is estimated, the point spread function may be applied for subsequent image data that is captured. Further, in one embodiment, the motion for the imaging device 150 may be detected using image data obtained during a preview image on display 106 before image data is captured and saved to memory 108.

Also, motion may be estimated without searching for streaks or highlights in a captured image data. Accordingly, one embodiment of a process element, such as the first process element 301 or second process element 302, may perform a routine of correcting or reducing motion blur in a captured image data by deconvolving the image data with PSFs of a single line with different values of direction and magnitude. Then, after each deconvolution of the image data, the resulting image can be evaluated with respect to a fitness function, such as image contrast. Accordingly, an estimated PSF that is closest to the actual PSF will produce an image having the greatest contrast after deconvolution than other PSFs which are not as close to the actual PSF. Using binary search/hill-climbing, as one non-limiting example, the direction and magnitude can be iteratively refined to obtain the best image within a given time or number of iterations. In one embodiment, this image process is performed when highlights or streaks are not detected within a captured image data and therefore another process for estimating motion may need to be performed.

Other possible approaches to motion estimation in accordance with the present disclosure employ peripheral aids integrated in the imaging device 150. In one embodiment, a motion sensory component 112 of the imaging device 150 is used to estimate motion of the device itself. As previously discussed, detection of motion is often a very important function during an image process, such as during encoding. Therefore, a motion sensory component 112 of the imaging device, such as an accelerometer, estimates a point spread function of motion of the device 150. The motion sensory component 112 may detect camera panning, vibration, rotation, zooming, etc., and feed such output along with the image sensor output to a process element 301, 302, such as an encoder 107 (which may be operating in real time). Using such supplemental output, the encoding process can be enhanced by limiting search areas for the direction and magnitude of an estimated PSF and providing a more realistic starting point for such restricted searching, such as by a second process element 302.

Additionally, one embodiment of a process element, such as the first process element 301 or second process element 302, may perform a routine of correcting or reducing motion blur in a captured image data with aid of a laser pointer 111 integrated in the imaging device 150. In one embodiment, the laser pointer 111 may reside on a separate area of the die that contains the image sensor 101.

In one embodiment, the laser pointer 111 may be a laser diode that projects an infrared dot or point into a scene being photographed, in one embodiment. As the imaging device 150 moves during exposure of an image being captured, the dot traces out the PSF and describes motion of the dot and the imaging device 150. Due to the laser being infrared, the dot will not be captured as part of the image recorded by the image sensor 101. Therefore, a corresponding supplemental image sensor 102 with an appropriate wavelength filter that captures image data and passes only the wavelength of the laser dot. Further, the supplemental image sensor 102 can capture the trace of the laser dot and provide the trace to the image process element 301, 302 in the image processing pipeline. Based on how the dot or point actually spreads, the image process element 301, 302 can estimate the PSF from the image data.

In an alternative embodiment, the laser pointer 111 may be a laser diode that projects a laser dot for a visible wavelength into a scene being photographed. Accordingly, a main image sensor 101 can capture the trace provided by the laser dot. Post image processing may then remove the visible trace from the final image before being outputted by the image processing circuitry 100.

In some embodiments, the laser pointer 111 is equipped with a lens that projects multiple laser dots or a particular pattern of laser dots as opposed to a single laser dot. Therefore, this allows for some of the laser dots to not be properly illuminating the scene, where remaining laser dot(s) may be available to still be used to detect motion and rotation of the laser dot(s) and the imaging device 150.

Figure 4A:
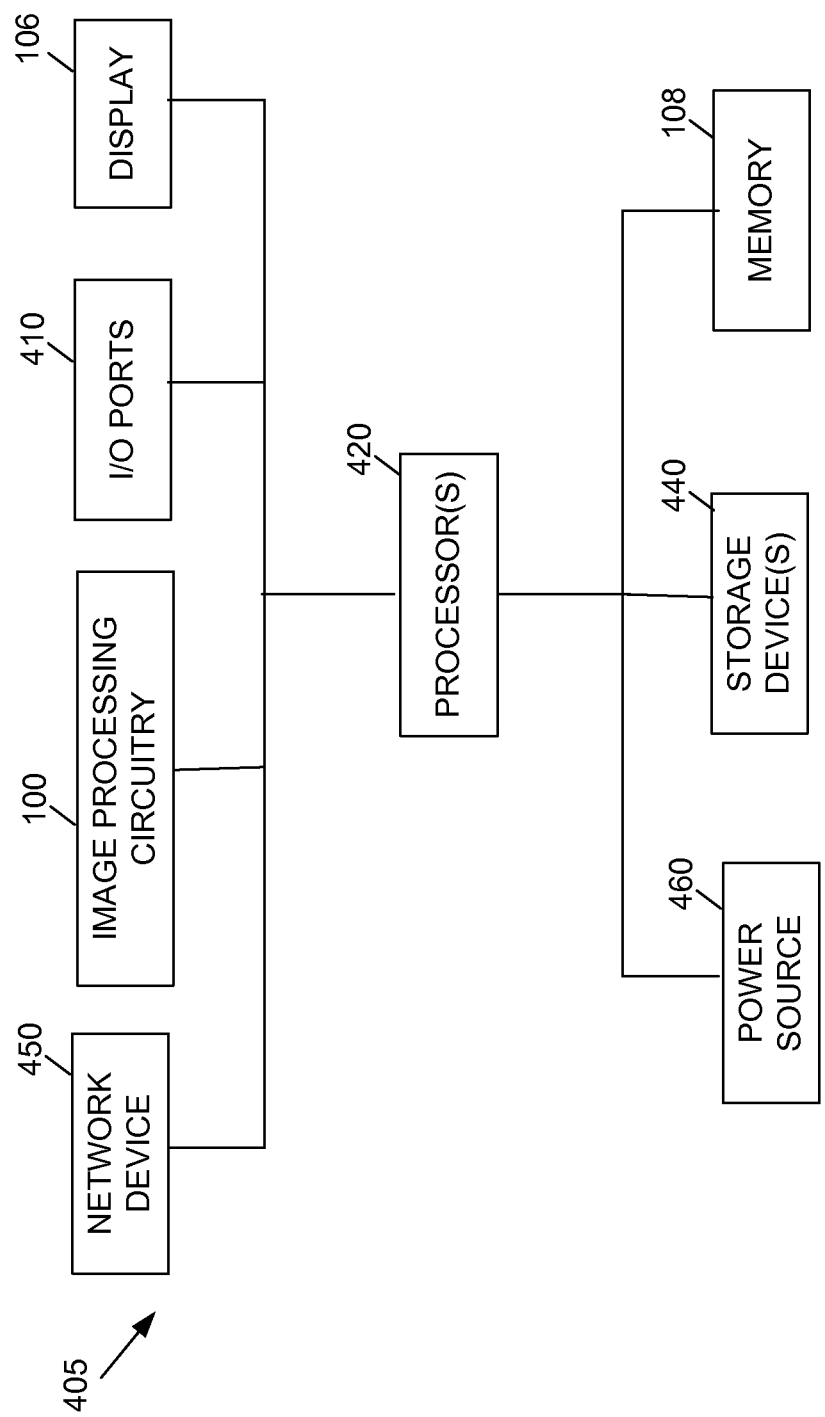
FIGS. 4A-4E are block diagrams illustrating examples of an electronic device employing the image processing circuitry of FIG. 1.

Keeping the above points in mind, FIG. 4A is a block diagram illustrating an example of an electronic device 405 that may provide for the processing of image data using one or more of the image processing techniques briefly mentioned above. The electronic device 405 may be any type of electronic device, such as a laptop or desktop computer, a mobile phone, tablet, a digital media player, or the like, that is configured to receive and process image data, such as data acquired using one or more image sensing components.

Regardless of its form (e.g., portable or non-portable), it should be understood that the electronic device 405 may provide for the processing of image data using one or more of the image processing techniques briefly discussed above, among others. In some embodiments, the electronic device 405 may apply such image processing techniques to image data stored in a memory of the electronic device 405. In further embodiments, the electronic device 405 may include one or more imaging devices 150, such as an integrated or external digital camera, configured to acquire image data, which may then be processed by the electronic device 405 using one or more of the above-mentioned image processing techniques.

As shown in FIG. 4A, the electronic device 405 may include various internal and/or external components which contribute to the function of the device 405. Those of ordinary skill in the art will appreciate that the various functional blocks shown in FIG. 4A may comprise hardware elements (including circuitry), software elements (including computer code stored on a computer-readable medium) or a combination of both hardware and software elements. For example, in the presently illustrated embodiment, the electronic device 405 may include input/output (I/O) ports 410, one or more processors 420, memory device 108, non-volatile storage 440, networking device 450, power source 460 (e.g., battery), and display 106. Additionally, the electronic device 405 may include one or more imaging devices 101, such as a digital camera, and image processing circuitry 100, including encoder 107. As will be discussed further below, the image processing circuitry 100 may be configured implement one or more of the above-discussed image processing techniques when processing image data. As can be appreciated, image data processed by image processing circuitry 100 may be retrieved from the memory 108 and/or the non-volatile storage device(s) 440, or may be acquired using the imaging device 150.

Before continuing, it should be understood that the system block diagram of the device 405 shown in FIG. 4A is intended to be a high-level control diagram depicting various components that may be included in such a device 405. That is, the connection lines between each individual component shown in FIG. 4A may not necessarily represent paths or directions through which data flows or is transmitted between various components of the device 405. Indeed, as discussed below, the depicted processor(s) 420 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Figure 4B:
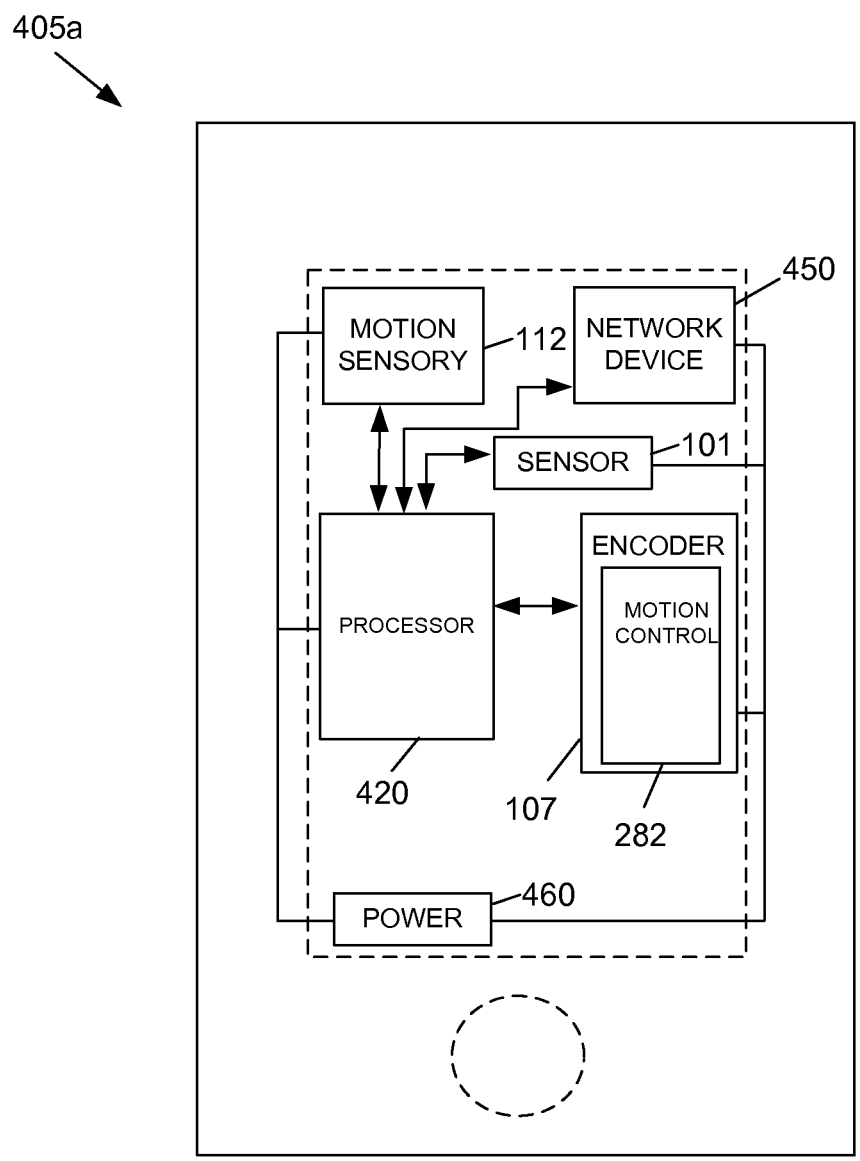

Electronic device 405 may comprise a variety of platforms in various embodiments. To illustrate, a smart phone electronic device 405a is represented in FIG. 4B, where the smart phone 405a includes at least one imaging device or sensor 101, at least one encoder 107 having motion control component 282, motion sensory component 112, a power source 460, and network device 450, among other components (e.g., display, processor 420, etc.). The smart phone 405a may transmit wireless signals to or receives wireless signals from at least one of a base station, an external terminal, and a server through a mobile communication network via the network device 450.

Figure 4C:
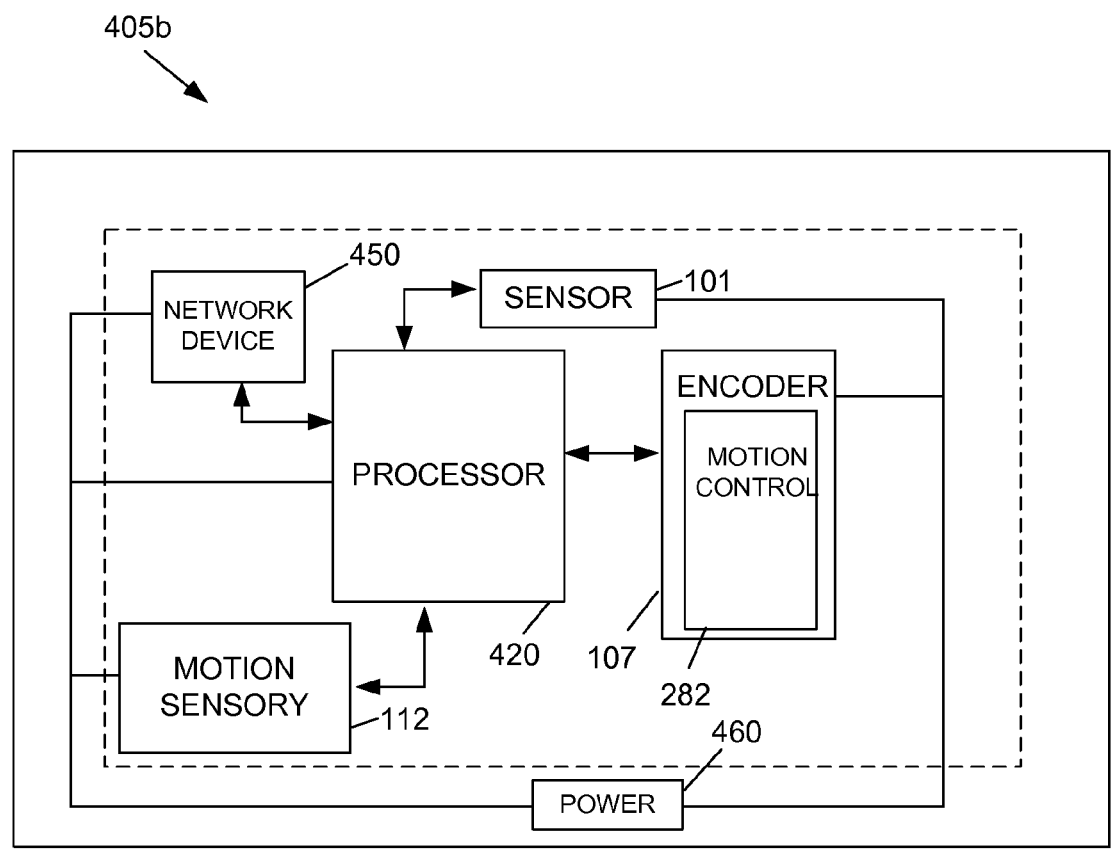
Figure 4D:
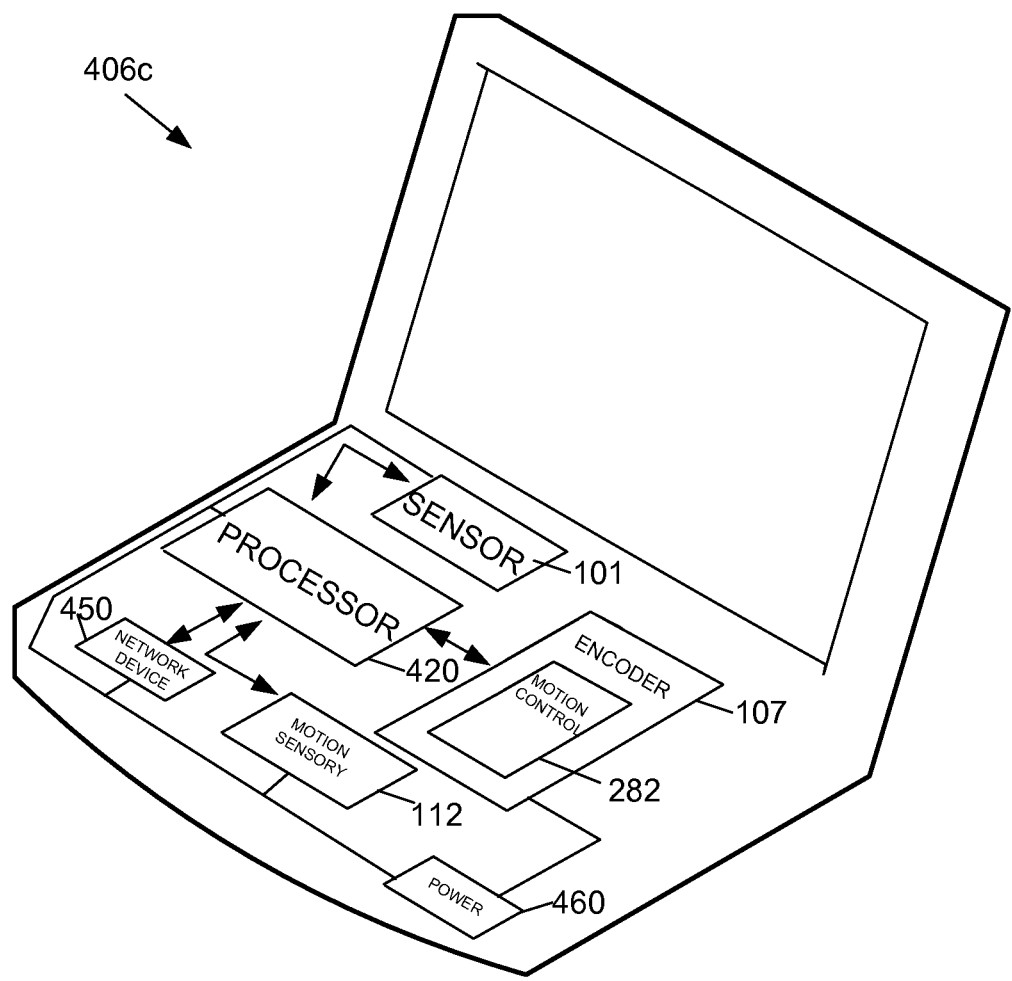
Figure 4E:
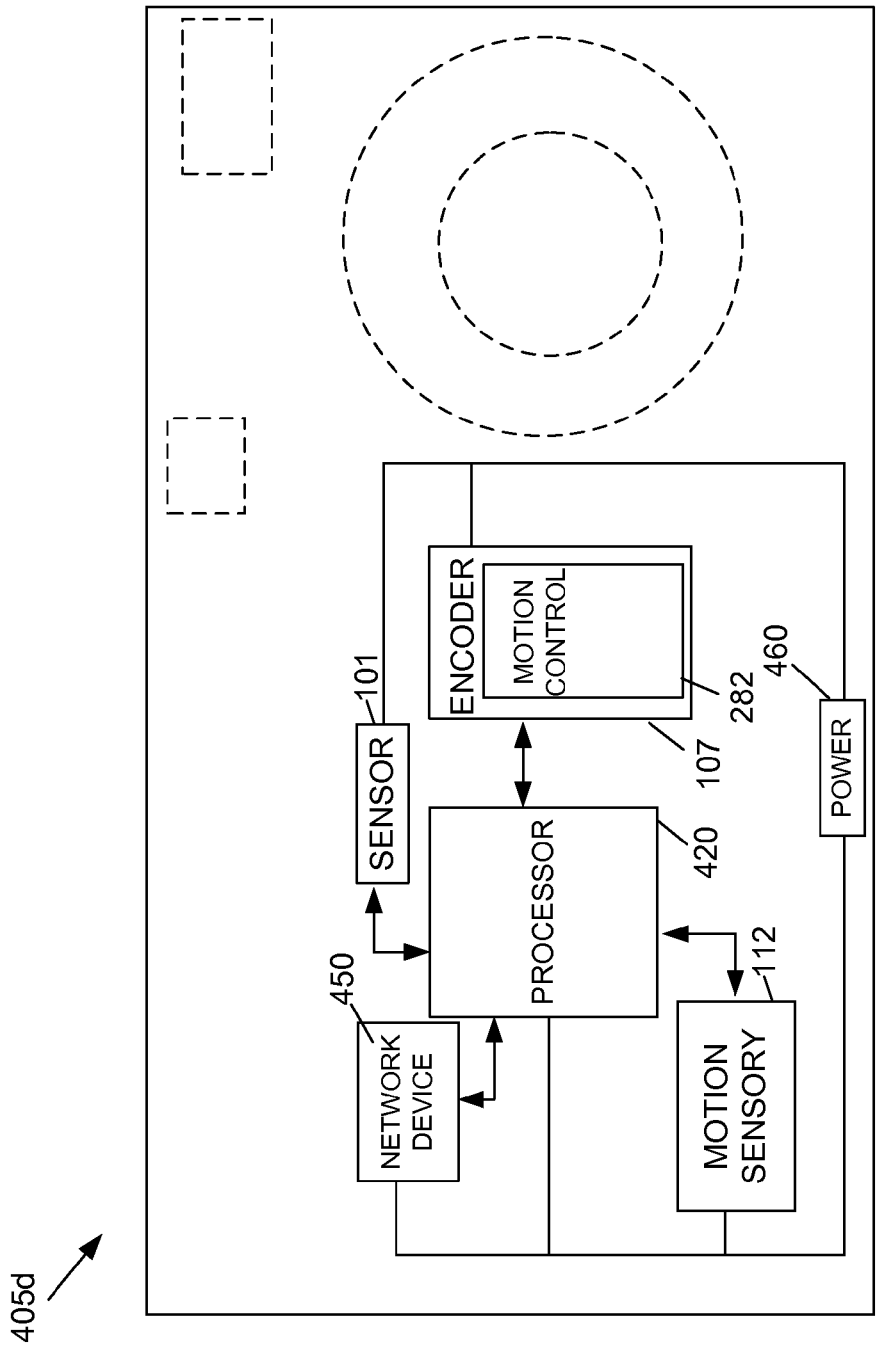

Further, a tablet electronic device 405b is represented in FIG. 4C, where the tablet 405b includes at least one imaging device or sensor 101, at least one encoder 107 having motion control component 282, motion sensory component 112, a power source 460, and network device 450, among other components (e.g., display, processor 420, etc.). Then, a laptop computer 406c is represented in FIG. 4D, where the laptop computer 406c includes at least one imaging device or sensor 101, at least one encoder 107 having motion control component 282, motion sensory component 112, a power source 460, and network device 450, among other components (e.g., display, processor 420, etc.). Also, a digital camera electronic device 405d is represented in FIG. 4E, where the digital camera 405d includes at least one imaging device or sensor 101, at least one encoder 107 having motion control component 282, motion sensory component 112, a power source 460, and network device 450, among other components (e.g., display, processor 420, etc.). Therefore, a variety of platforms of electronic devices may be integrated with the encoder 107 and motion control component 282 of the various embodiments.

Figure 5:
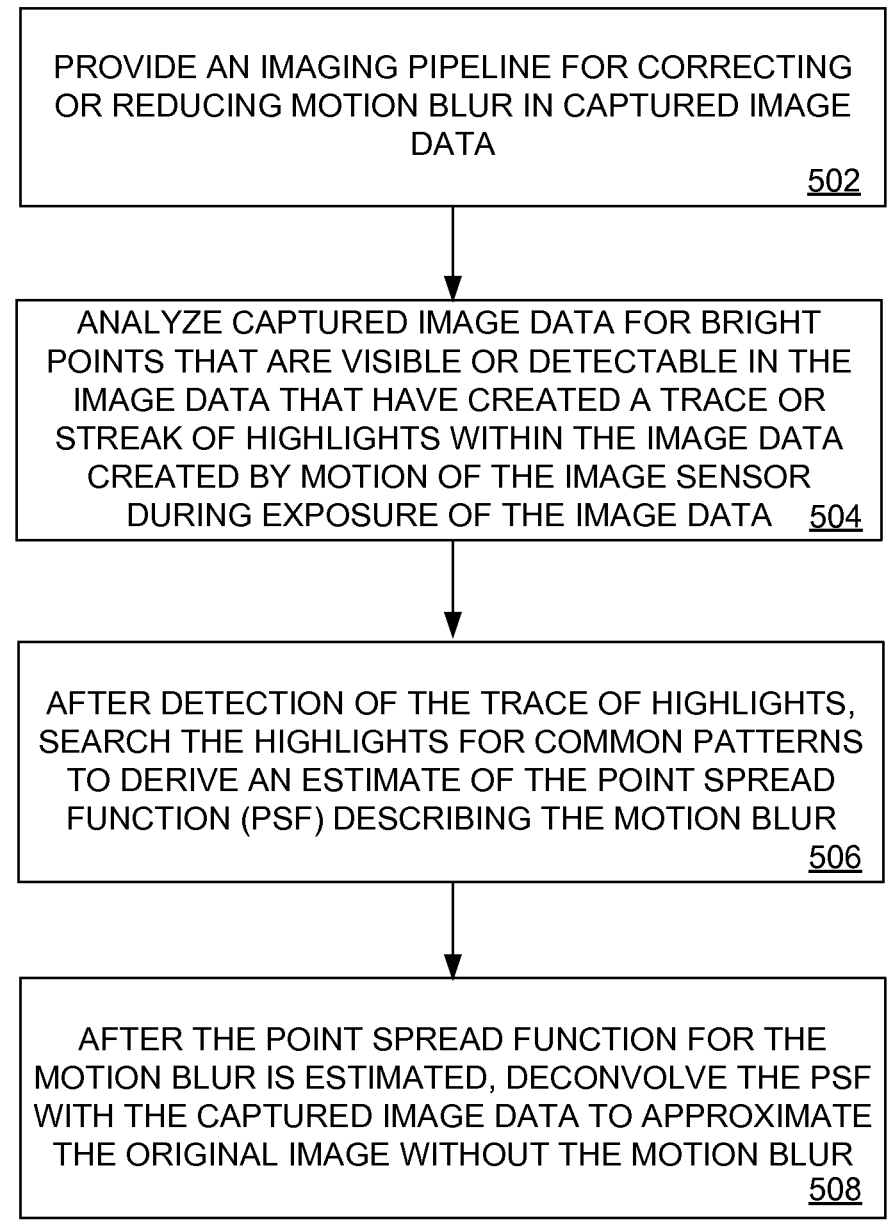
FIGS. 5-11 are flow chart diagrams depicting various functionalities of embodiments of image processing circuitry of FIG. 1.

Referring next to FIG. 5, shown is a flowchart that provides one example of the operation of a portion of the image processing circuitry 100 according to various embodiments. It is understood that the flowchart of FIG. 5 provides merely an example of the many different types of functional arrangements that may be employed to implement the operation of the portion of the image processing circuitry 100 as described herein. As an alternative, the flowchart of FIG. 5 may be viewed as depicting an example of steps of a method implemented in the electronic device 405 according to one or more embodiments.

Beginning in step 502, imaging processing circuitry 100 provides an imaging pipeline for correcting or reducing motion blur in captured image data. As described in step 504, captured image data is analyzed for bright points that are visible or detectable in the image data that have created a trace or streak of highlights within the image created by motion of the imager or image sensor 101 during exposure of the image data. Additionally, after detection of such a trace of highlights, the highlights are searched for common patterns to derive an estimate of the point spread function (PSF) describing a motion blur, as depicted in step 506. Therefore, once the point spread function for the motion blur is estimated, the PSF is deconvolved with the captured image data to approximate the original image without the motion blur, in step 508.

Figure 6:
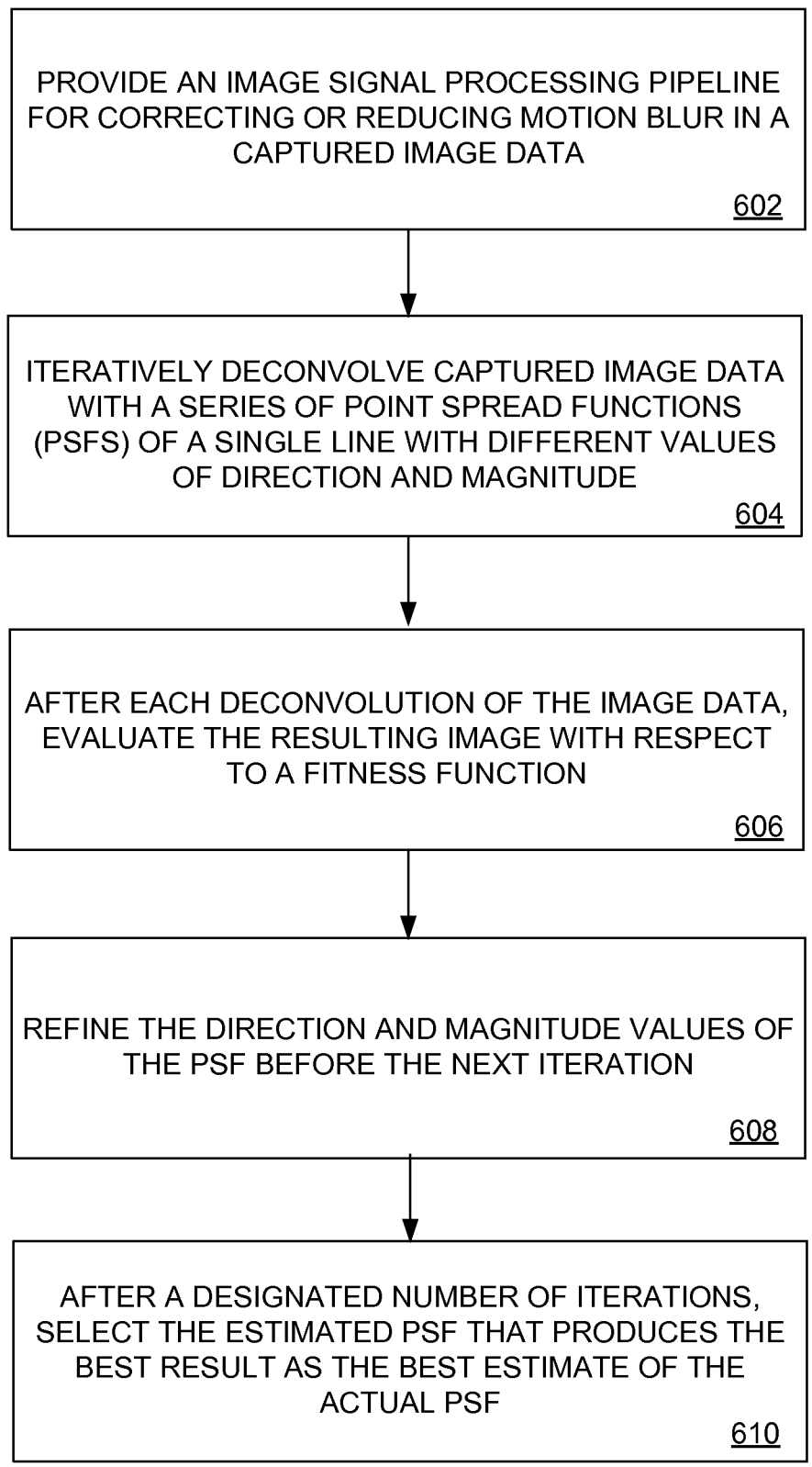

Next, referring to FIG. 6, shown is a flowchart that provides an additional example of the operation of a portion of the image processing circuitry 100 according to various embodiments. Beginning in step 602, imaging processing circuitry 100 provides an image signal processing pipeline for correcting or reducing motion blur in captured image data. In step 604, a captured image data is iteratively deconvolved with a series of point spread functions (PSFs) of a single line with different values of direction and magnitude. After each deconvolution of the image data, the resulting image is evaluated with respect to a fitness function, such as image contrast, in step 606. Accordingly, an estimated PSF that is closest to the actual PSF will produce an image having the greatest contrast after deconvolution than other PSFs which are not as close to the actual PSF. Therefore, the direction and magnitude values are refined before the next iteration, in step 608. After a designated number of iterations, the estimated PSF that produces the best results (e.g., greatest contrast) is chosen as the best estimate of the actual PSF, in step 610. In one embodiment, this image process is performed responsive to highlights or streaks not being detected within captured image data, as described in the process of FIG. 5.

Figure 7:
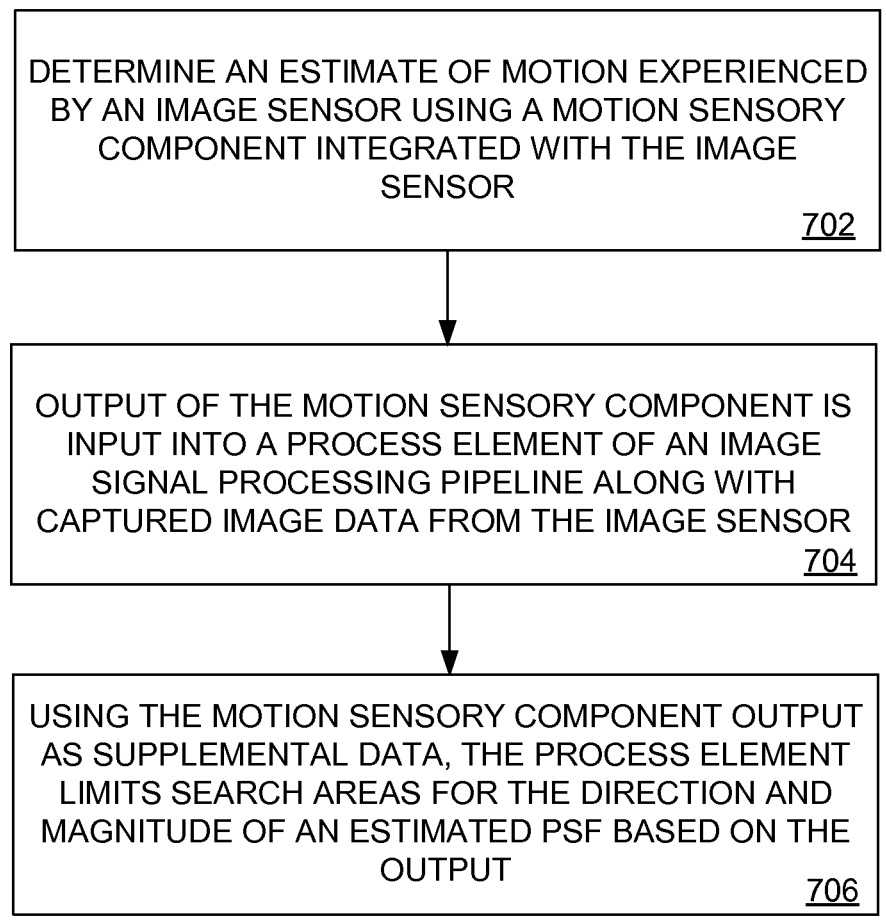

In FIG. 7, a flow chart is shown that provides an additional example of the operation of a portion of the image processing circuitry 100 according to various embodiments. Beginning in step 702, a motion sensory component integrated with an imaging device 150 determines an estimate of motion experienced by an image sensor or imager 101 also integrated with the imaging device 150. The motion sensory component may detect camera panning, vibration, rotation, zooming, etc. Further, output of the motion sensory component 112 is input into a process element of an image signal processing pipeline implemented by pipeline processing logic 104 along with captured image data, in step 704. Using the motion sensory component 112 output as supplemental data, the process element limits search areas for the direction and magnitude of an estimated PSF based on the output and provides a more realistic starting point for such restricted searching, in step 706. Further, in some embodiments, the supplemental motion related data or information is generated at least near the time of the capture of the image data. Accordingly, the captured image data and the motion related information have at least some time synchrony.

Figure 8:
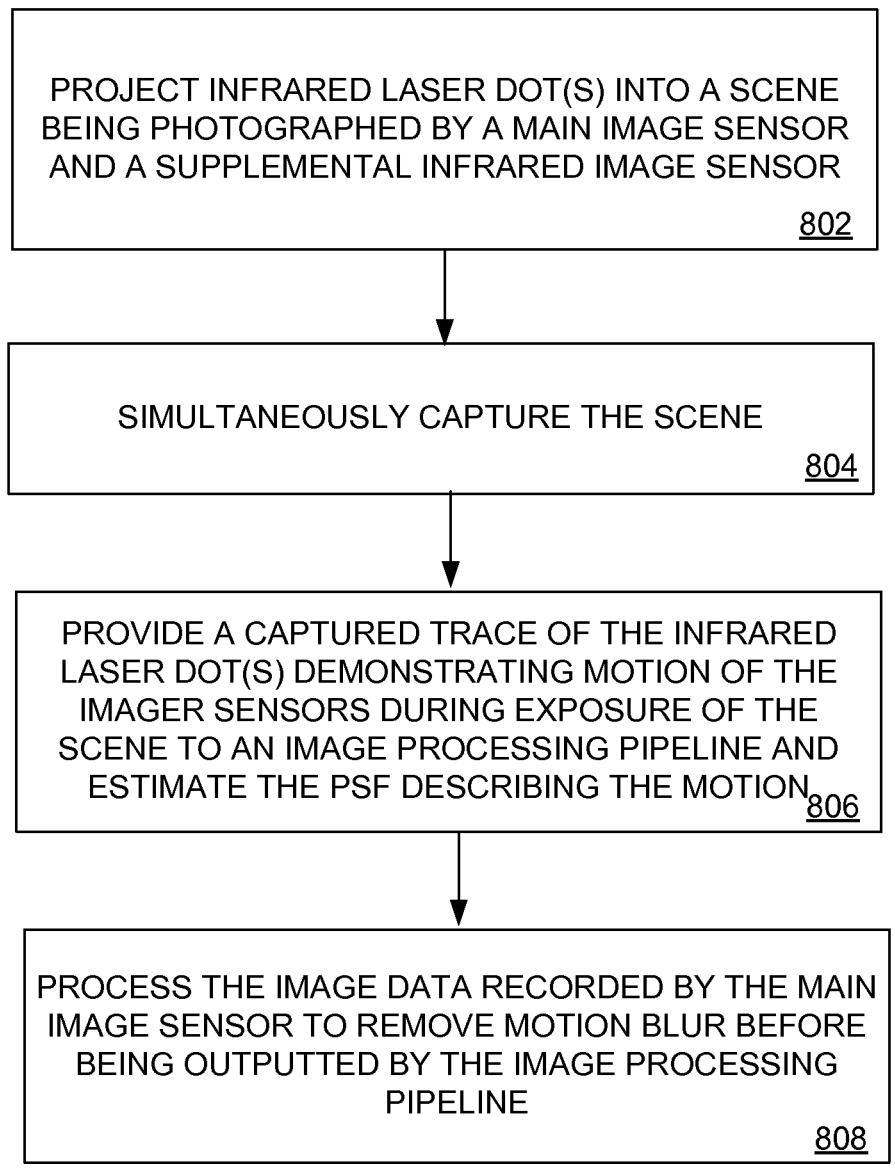

Further, in FIG. 8, a flow chart is shown that provides an additional example of the operation of a portion of the image processing circuitry 100 according to various embodiments. Beginning in step 802, a laser pointer device 111 projects one or more infrared dots or points into a scene being photographed by a main image sensor 101 and a supplemental infrared imager 102, in step 804. As the image sensors 101, 102 move during exposure, the infrared dot(s) trace out the PSF describing motion of the image sensors 101, 102. Accordingly, the main image sensor 101 and the supplemental image sensor 102 simultaneously record the scene, where the supplemental image sensor 102 thereby captures a trace of the infrared laser dot(s) demonstrating motion of the image sensors during exposure of the scene. The supplemental image sensor 102 provides a capture of the trace to the image process element in the image processing pipeline, and based on how the dot(s) or point(s) actually spread, as evidenced by the trace, the process element estimates the PSF, in step 806. Post image processing then removes motion blur from the image data recorded by the main image sensor or imager 101, before being outputted by the image processing pipeline, in step 808.

Figure 9:
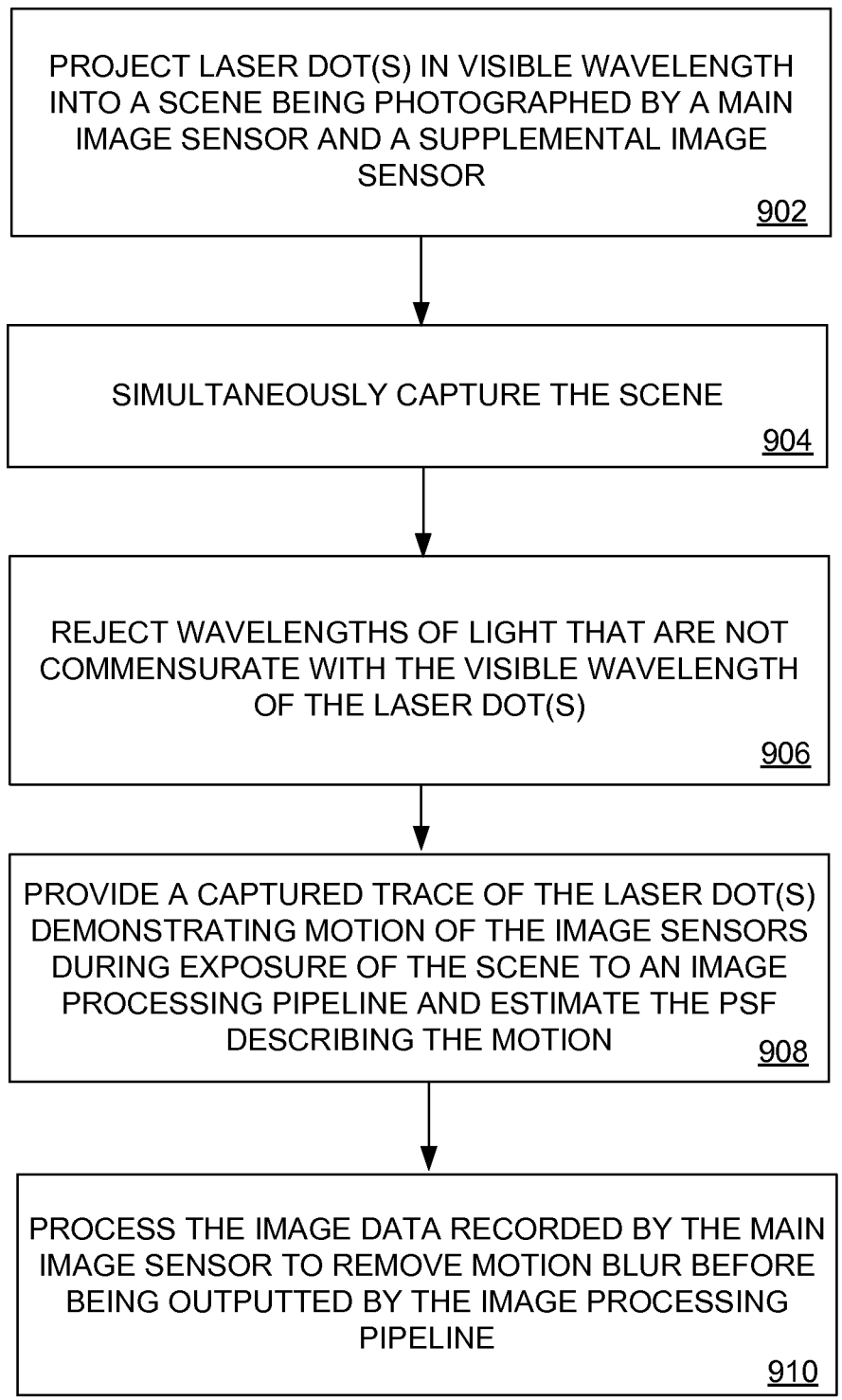

Next, in FIG. 9, a flow chart is shown that provides an additional example of the operation of a portion of the image processing circuitry 100 according to various embodiments. Beginning in step 902, a laser pointer device 111 operating in a visible wavelength projects one or more laser dots or points into a scene being photographed by an image sensor 101 and a supplemental image sensor 102, in step 904. As the image sensors 101, 102 move during exposure, the laser dot(s) trace out the PSF describing motion of the image sensors 101, 102. The supplemental image sensor 102 operates a wavelength filter rejecting wavelengths of light from passing that are not commensurate with the visible wavelength of the laser pointer device 111, in step 906. The supplemental image sensor 111 provides a capture of the trace to the image process element in the image processing pipeline, and based on how the dot(s) or point(s) actually spread, as evidenced by the trace, the process element estimates the PSF, in step 908. Post image processing then removes motion blur from the image data recorded by the main image sensor or imager 101, before being outputted by the image processing pipeline, in step 910.

Figure 10:
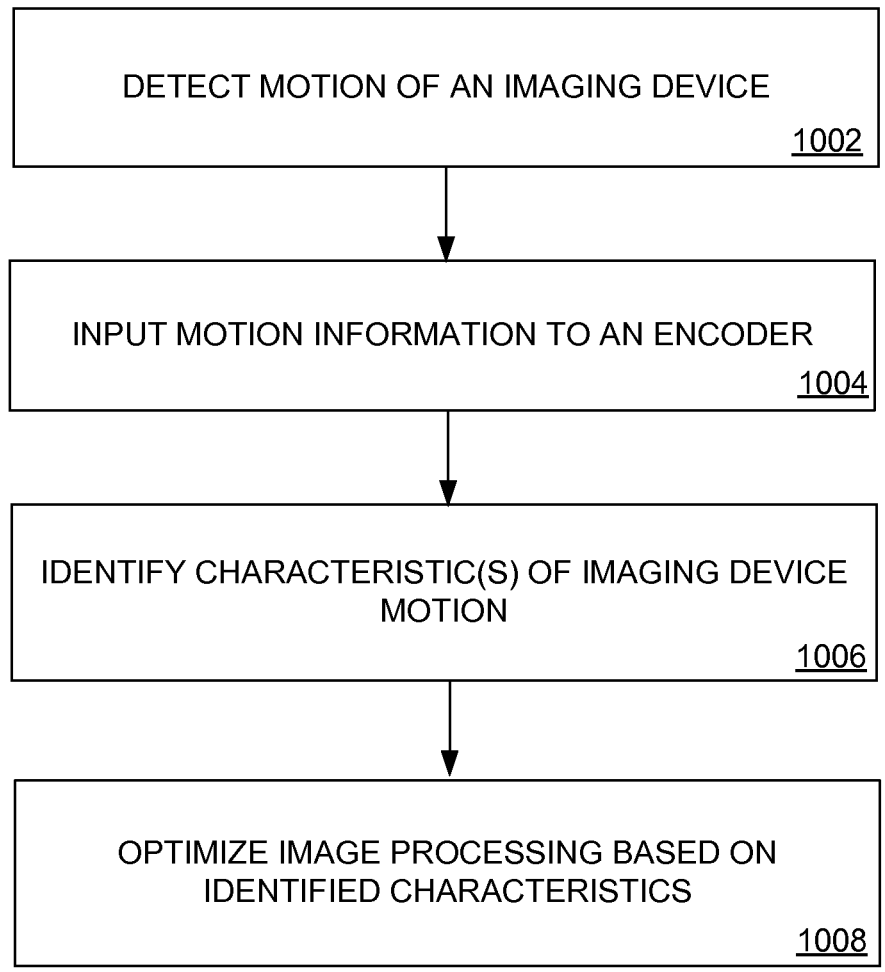

In addition to the above embodiments, FIG. 10 depicts operation of a portion of the image processing circuitry 100 according to various embodiments. In this embodiment, motion information is used to assist in an encoding process (or encoding sub-processes) which may not necessarily involve correcting motion blur. While frame to frame image processing performed by an encoder is done blindly in conventional processes, the embodiment of FIG. 10 inputs motion information to an encoder 107, where the motion information is used in optimizing image processing.

Starting with step 1002, motion of an imaging device 150 is detected and motion information is input to an encoder 107 that is processing image frames captured by the imaging device 150, in step 1004. As an example, feeds from zoom lensing, rotational information, etc., may be provided as inputs into the encoder 107. This supplemental motion information allows the encoder 107 (or other imaging processing component) to determine if the imaging device 150 has moved, such as having zoomed, panned, vibrated, etc., and to identify characteristics of the imaging device motion, such as the motion type, in step 1006. Then, in step 1008, motion information that has been input is used to optimize image processing by the encoder 107 based on the identified characteristics.

To illustrate, real time encoding may involve inter-frame correlation for compression, where on a block by block basis in a current frame, a search process is performed which involves comparing a current frame block with neighboring frame blocks in and around the same vicinity of the frame. When a closely matching neighboring block is found, a location offset from the current frame block is generated (e.g., motion vector) as well as difference signals between the two. In conventional processes, this searching process is very time/resource/power consuming as there is no knowledge as to how far and in what direction such block counterpart will be found.

However, motion sensory component(s) 112 to the imaging device 150 can detect imaging device or camera panning, vibration, rotation, etc., and feed such output along with the frame output to an encoder 107 (which may be operating in real time). Using such supplemental motion information, the encoding process can be enhanced by limiting search areas and providing a more realistic starting point for such restricted searching. For example, by identifying that the imaging device 150 captured a first frame and then panned to the right before capturing the second frame, it may be advantageous to begin comparing a current frame block at a center of the first frame with blocks on the left side of the second frame, since an item being captured at the center of the first frame is shifting to the left in subsequent frames as the imaging device 150 pans to the right. Therefore, in this example, supplemental motion information may be used to select a starting point in which to search for the block counterpart in frame by frame image processing. This is but one possible example, and other uses for the motion information to optimize image processing are also contemplated.

Figure 11:
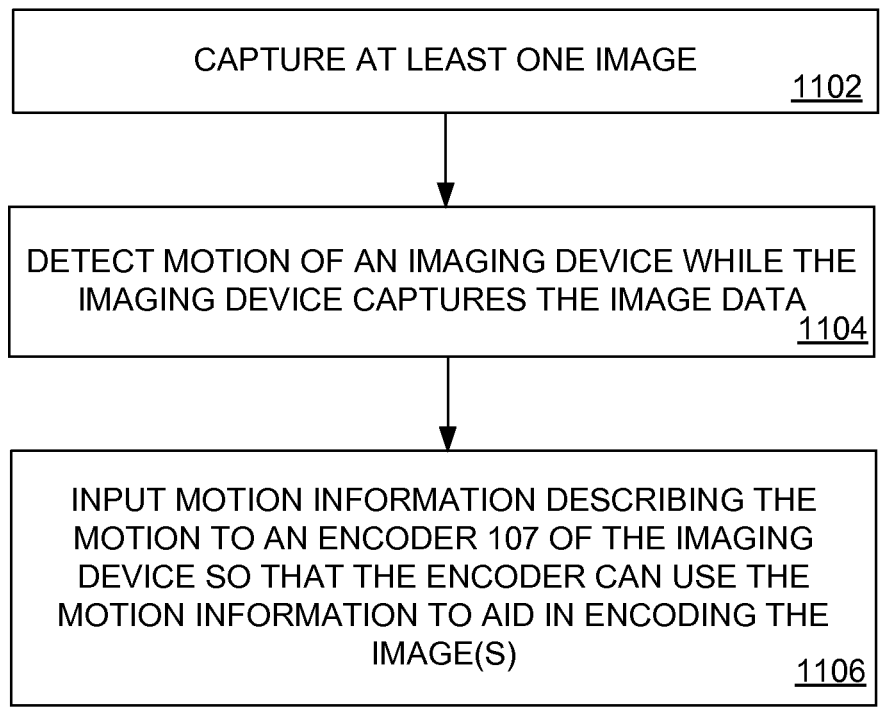

Referring now to FIG. 11, a flow chart is shown that provides a further example of the operation of a portion of the image processing circuitry 100 according to various embodiments. Beginning in step 1102, at least one image is captured by an imaging device 150. Moreover, motion of the imaging device is detected while the imaging device 150 captures the image data, in step 1104. Accordingly, in step 1106, motion information describing the motion is input to an encoder 107 of the imaging device 150 so that the encoder 107 can use the motion information to aid in encoding the image(s).

Any process descriptions or blocks in flow charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described various embodiments, at least the following is claimed:

1. An encoding system comprising:
    processing circuitry configured to perform encoding of image data, the encoding including a plurality of encoding sub-processes;
    imaging circuitry configured to capture and deliver raw image data to the processing circuitry;
    second circuitry, independent of the imaging circuitry, configured to deliver motion related information to the processing circuitry, the motion related information being generated at least near a time of capture by the imaging circuitry of the raw image data and being derived independently of analysis of the raw image data; and
    the processing circuitry is configured to modify at least one of the plurality of encoding sub-processes of the raw image data using the motion related information that was derived independently of the analysis of the raw image data, wherein the at least one of the plurality of encoding sub-processes comprises compressing the raw image data.

2. The encoding system of claim 1, the plurality of encoding sub-processes comprising:
    a process to correct motion blur detected in the raw image data, wherein the process derives a point spread function of motion that caused the motion blur by projecting an infrared point onto a scene that is captured by secondary imaging circuitry.

3. The encoding system of claim 1, wherein the at least one of the plurality of encoding sub-processes searches neighboring frames of the raw image data for a current block of image data and excludes at least one neighboring frame from being searched based on the motion related information.

4. The encoding system of claim 1, wherein the at least one of the plurality of encoding sub-processes, based on the motion related information, constrains a search for a motion vector in a particular area of the raw image data captured during movement of an image sensor that captured the raw image data.

5. The encoding system of claim 1, wherein the at least one of the plurality of encoding sub-processes classifies motion detected during capturing of the raw image data and uses the classification to accelerate encoding of the raw image data.

6. The encoding system of claim 5, wherein the classification characterizes a nature of the motion, the classification comprising at least one of zooming, panning, or vibration.

7. The encoding system of claim 1, the second circuitry comprising:
    a motion sensory component configured to detect motion of an image sensor that captured the raw image data and configured to output the motion related information,
    wherein the motion related information is separate from motion estimation data.

8. The encoding system of claim 7, wherein the motion sensory component comprises one of an accelerometer or a gyroscope.

9. The encoding system of claim 7, wherein the motion sensory component comprises image stabilization circuitry or zoom control circuitry for an optical lens configured to be used in capturing the raw image data.

10. An encoding device comprising:
    processing circuitry configured to perform encoding of image data, the encoding including a plurality of encoding sub-processes;
    interface circuitry through which the processing circuitry is configured to receive both raw image data and motion related information, receipt of the raw image data and the motion related information having at least some time synchrony, wherein the motion related information is derived independently of analysis of the raw image data;
    the processing circuitry is configured to perform the encoding of the raw image data; and
    the processing circuitry, using the motion related information, is configured to modify at least one of the plurality of encoding sub-processes of the raw image data,
    wherein at least one of the plurality of encoding sub-processes uses the motion related information that was derived independently of the analysis of the raw image data to facilitate a motion estimation process that is part of the encoding of the raw image data.

11. The encoding device of claim 10, the plurality of encoding sub-processes comprising:
    a process to correct motion blur detected in the raw image data, wherein the process derives a point spread function of motion that caused the motion blur by projecting an infrared point onto a scene that is captured by secondary imaging circuitry.

12. The encoding device of claim 10, wherein the at least one of the plurality of encoding sub-processes searches neighboring frames of the raw image data for a current block of image data and excludes at least one neighboring frame from being searched based on the motion related information.

13. The encoding device of claim 10, further comprising an image sensor configured to capture the raw image data.

14. The encoding device of claim 10, the interface circuitry comprising:
    a motion sensory component configured to detect motion of an image sensor that captured the raw image data and configured to output the motion related information.

15. The encoding device of claim 14, wherein the motion sensory component comprises one of an accelerometer or a gyroscope.

16. The encoding device of claim 14, wherein the motion sensory component comprises one of image stabilization circuitry or zoom control circuitry for an optical lens configured to be used in capturing the raw image data.

17. The encoding device of claim 10, wherein the at least one of the plurality of encoding sub-processes classifies motion detected during capturing of the raw image data and uses the classification to accelerate encoding of the raw image data.

18. The encoding device of claim 17, wherein the at least one of the plurality of encoding sub-processes modifies an encoding frame rate using the classification and responsive to the motion being classified.

19. The encoding device of claim 17, wherein the at least one of the plurality of encoding sub-processes modifies an encoding resolution using the classification and responsive to the motion being classified.

20. A method comprising encoding of image data by processing circuitry, the encoding including a plurality of encoding sub-processes;

capturing and delivering raw image data to the processing circuitry;

delivering motion related information to the processing circuitry, the motion related information being generated at least near a time of capture of the raw image data and being derived independently of analysis of the raw image data; and using the motion related information to modify at least one of the plurality of encoding sub-processes of the raw image data, wherein at least one of the plurality of encoding sub-processes comprises classifying a type of motion detected during capturing of the raw image data and using the classification to facilitate acceleration of compressing of the raw image data.

* * * * *